A. McKENNEY.

Nut-Locking Devices for Railroad Rail-Joints.

No. 5,308. Reissued March 4, 1873.

Witness:
Jas. E. Hutchinson
C. L. Everts

Inventor.
Alnerson McKenney
per Chandler Thurston
Attorneys.

AM. PHOTO-LITHOGRAPHIC CO. N.Y. (OSBORNE'S PROCESS.)

UNITED STATES PATENT OFFICE.

ALMERON McKENNEY, OF MAUMEE CITY, OHIO.

IMPROVEMENT IN NUT-LOCKING DEVICES FOR RAILROAD-RAIL JOINTS.

Specification forming part of Letters Patent No. 116,975, dated July 11, 1871; reissue No. 5,308, dated March 4, 1873.

DIVISION B.

*To all whom it may concern:*

Be it known that I, ALMERON McKENNEY, of Maumee City, in the county of Lucas, and in the State of Ohio, have invented certain new and useful Improvements in Nut-Locking Device for Railroad-Rails; and do hereby declare that the following is a full, clear, and exact description thereof, reference being had to the accompanying drawing and to the letters of reference marked thereon making a part of this specification.

The nature of my invention relates to a locking device for railroad splices, and consists of a flat metal-plate provided with one or more square recesses, and placed on the outside of a fish-piece or parts of a compound rail, so that the nut or bolt head, which passes through, will fit into the recess in the plate; the latter being held in place by a spike, all as more fully hereinafter set forth.

Figure 1:
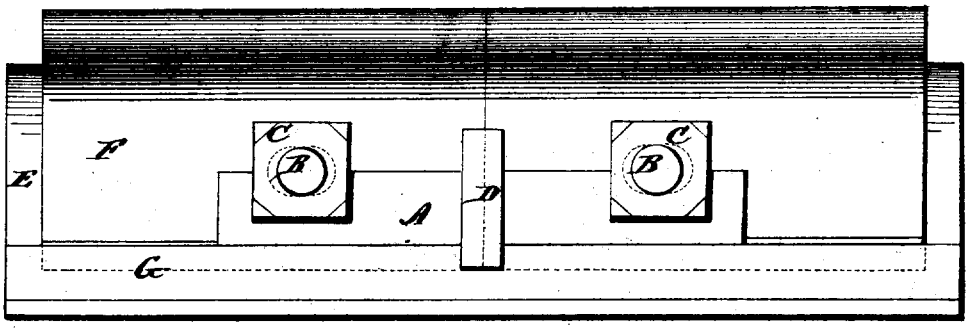
Figure 2:
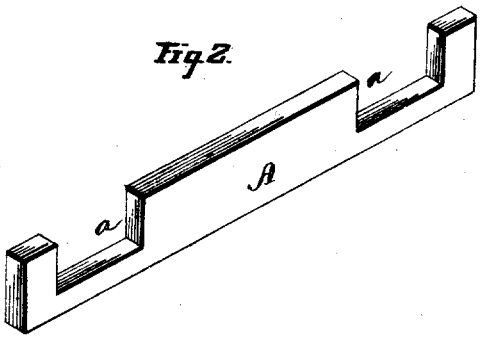
Figure 3:
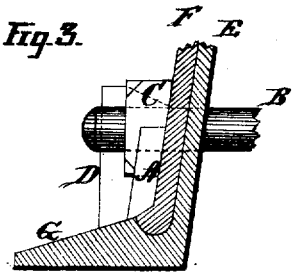

Figure 1 of the drawing represents the invention as applied to my compound rail. Fig. 2 represents a perspective view of the locking-plate. Fig. 3 represents a section of my patented compound rail, showing an end view of the plate, nut, and plate-securing spike.

The main object of my invention is to provide a device for locking nuts in railroad rails, that can be cheaply made; is simple in its construction and effectual in operation. To this end I take a flat bar of metal, A, of suitable width and thickness, and form one or more square recesses, *a a*, in its upper edge, this recess (or recesses) to be of a width equal to the width of the nut or bolt-head to which it is to be applied. If but one bolt is to be locked, the plate is made one-half the length shown in Fig. 2. If more than two nuts or bolts are to be locked the plate A is made of a length and provided with a suitable number of recesses, *a*, to accommodate the same.

The plate A is placed upon one or both sides of the rail, with the lower edge resting upon the flange G of the rail.

In the drawing, E F represents the inner and outer sections of a compound rail; B the bolt which passes through and connects the two parts; C the nut on the end of the bolt; A the the locking-plate, so placed that the walls of each recess, *a*, bear against the bottom and each of the two sides of the nut C, the bottom edge of the plate resting upon the flange G of the rail; D represents the spike which holds the plate close up to the side of the rail or fish-piece, and prevents it from getting out of its proper place. Where my invention is employed with an ordinary rail, the plate is used on the exterior of the fish-piece instead of the exterior of the outer rail; F and the spike D which holds the plate in place can be either driven through the flange of the rail or driven into the tie on the outer edge of the flange so that the head of the spike will bear directly against the plate.

Any known form of bolt or nut may be used, and the plate and spike may be used with any known form of railroad rail or fish-piece.

After the bolt is applied and tightened the plate is attached, as before described, and the spike driven down on its outside, thus effectually preventing the bolt from being disengaged or the plate from losing its proper position.

It is obvious that the locking-plate, as shown, can in some cases be made of material other than metal, and be made to accomplish the same result.

Having thus fully described my invention, what I claim as new, and desire to secure by Letters Patent, is—

The within-described locking-plate, consisting of the flat bar A, provided with one or more recesses, *a*, cut into its upper edge, as shown, the bar being placed on its edge on the flange of a railroad rail and held contiguous to the rail by a spike, D, driven from the outside, all as and for the purposes set forth.

In testimony that I claim the foregoing I have hereunto set my hand this 13th day of January, 1873.

ALMERON McKENNEY.

Witnesses:
C. L. EVERT,
A. N. MARR.